(No Model.)

T. BATES.
TOOL HANDLE.

No. 259,079. Patented June 6, 1882.

WITNESSES:
C. Neveux
C. Sedgwick

INVENTOR:
T. Bates
BY Munn & Co
ATTORNEYS.

UNITED STATES PATENT OFFICE.

THOMAS BATES, OF JANESVILLE, WISCONSIN.

TOOL-HANDLE.

SPECIFICATION forming part of Letters Patent No. 259,079, dated June 6, 1882.

Application filed November 26, 1881. (No model.)

*To all whom it may concern:*

Be it known that I, THOMAS BATES, of Janesville, in the county of Rock and State of Wisconsin, have invented a new and Improved Universal Tool-Handle, of which the following is a full, clear, and exact description.

Reference is to be had to the accompanying drawings, forming part of this specification, in which similar letters of reference indicate corresponding parts in all the figures.

Figure 1:
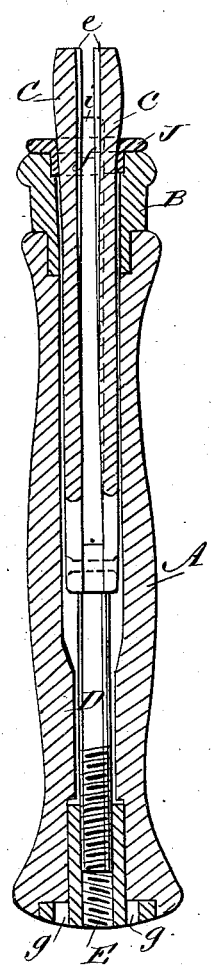
Figure 2:
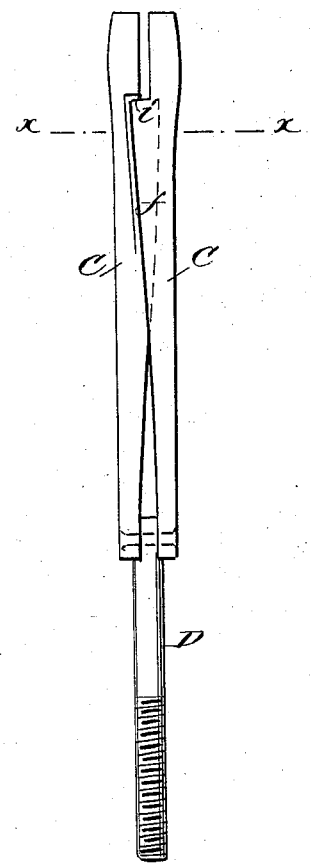
Figure 3:
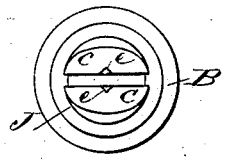
Figure 4:
Figure 6:
Figure 5:
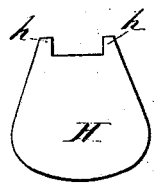

Figure 1 is a sectional elevation of my improved handle. Fig. 2 is a side elevation of the hinged and adjustable jaws. Fig. 3 is an end view of the handle. Fig. 4 is a sectional view of the jaws, taken on the line $x\ x$ of Fig. 2. Fig. 5 is a plan view of the key used to loosen and tighten the jaws, and Fig. 6 is a perspective view of the take-up ring.

A represents the handle, which is hollow from end to end and provided with the heavy metal ring or ferrule B; and C C represent the jaws, which are hinged at their inner ends to the screw-threaded bolt D, which enters the headed internally-threaded nut E, which enters and is adapted to be turned in the butt-end of the handle, as shown in Fig. 1, for loosening and tightening the jaws. The jaws are formed with the side flanges, $f\ f$, which lap past the main faces of the jaws, as shown in Fig. 4, and inclose the tang or upper end of the tool, and thus prevent the tool from turning sidewise between the jaws. These side flanges do not extend to the ends of the jaws, but are made so as to form the shoulders or stops $i\ i$, as shown in Figs. 1 and 2, to limit the distance of insertion of the tool. The inner faces of the jaws are formed with the shallow gutters $e\ e$, adapted to hold the shanks of awls and other similar small implements or tools.

When small tools are to be held in the handle the take-up ring or sleeve J is to be put upon the jaws, which is of smaller diameter of bore than the ferrule B, and, owing to the enlargement of the jaws near their outer ends, will quickly cause the faces of the jaws to be forced close together when the jaws are drawn up by the nut E. For large tools this ring or sleeve J will not be needed, as the ferrule B will cause the jaws to be clasped firmly upon the shank of the tools for holding them securely.

The head of the screw or nut E is formed with the holes $g\ g$, in which the projections $h\ h$ of the wrench H are adapted to be placed for turning the screw or nut for loosening and tightening the jaws.

By this construction of the handle it will be seen that the tool will be firmly and securely held between the jaws, and that the handle is adapted to hold both large and small tools with equal facility.

In some instances the sleeve or nut E, instead of having the holes $g\ g$, adapting the same to be used with the wrench H, will be formed with a crease, like an ordinary woodscrew, to be turned with an ordinary screwdriver or with a small especially-adapted wrench formed with a suitable edge or lip for engaging with the crease of the nut.

Having thus fully described my invention, I claim as new and desire to secure by Letters Patent—

1. The jaws of a tool-holder provided with side flanges, $f\ f$, overlapping their main faces on opposite sides and in opposite directions, coming short of the length of the jaws and forming shoulders $i\ i$, as shown and described.

2. The combination, with the hollow handle A, the ferrule B, and the adjustable hinged jaws having shallow gutters $e\ e$, of the sleeve J, whereby small tools may be conveniently held, as set forth.

THOMAS BATES.

Witnesses:
WILLIAM E. FULLER,
ALBERT HURD.